March 9, 1948. N. GAMBINO ET AL 2,437,316
MEAT SCRAPER
Filed April 5, 1946
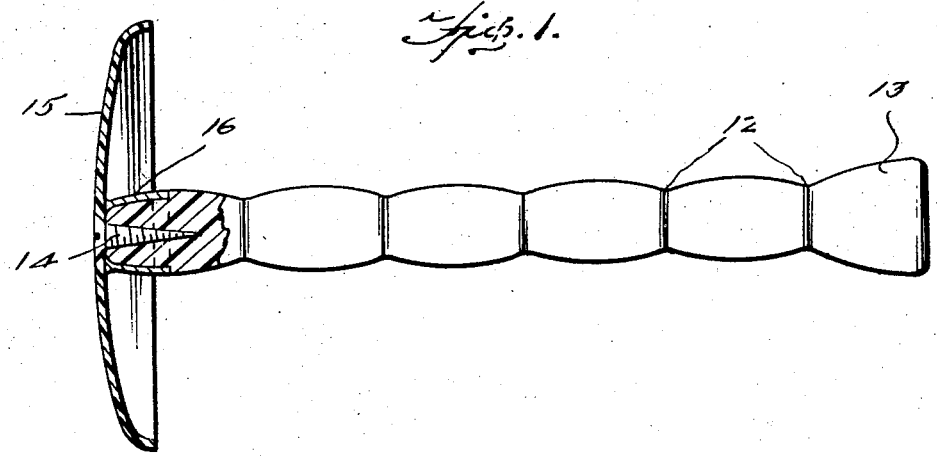
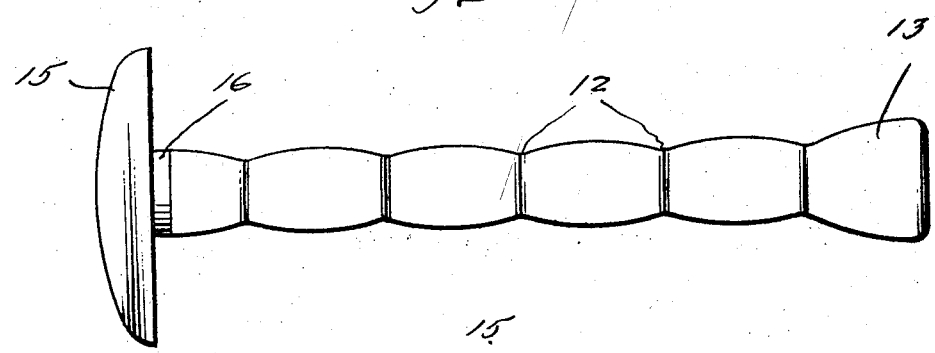
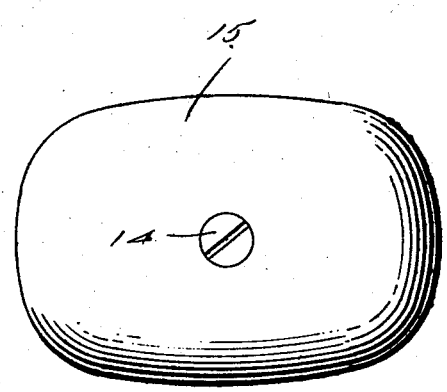
Inventors
Nate Gambino
Nate La Rose
Attorneys Patented Mar. 9, 1948

2,437,316

UNITED STATES PATENT OFFICE 2,437,316

MEAT SCRAPER

Nate Gambino and Nate La Rosa, Modesto, Calif.

Application April 5, 1946, Serial No. 659,832

2 Claims. (Cl. 15—236)

This invention relates to meat scrapers, and more particularly to a scraper of sanitary construction adapted to remove undesirable surface accumulations of bone dust, and the like, from cuts of meat.

A main object of the invention is to provide a novel and improved meat scraper of very simple construction, which is very easy to use and easy to clean.

A further object of the invention is to provide an improved meat scraper adapted to readily remove accumulations of bone dust and other undesirable material from meat surfaces, said scraper being very inexpensive to manufacture and efficient in operation.

Further objects and advantages of the invention will become apparent from the following description and claims, and from the accompanying drawings, wherein:

Figure 1 is a front elevational view, partly in cross-section, of a meat scraper constructed in accordance with the present invention.

Figure 2 is a side elevational view of the meat scraper of Figure 1.

Figure 3 is an end view of the meat scraper of Figure 1.

Referring to the drawings, 11 designates the handle portion of the meat scraper, said handle portion being made of smooth plastic, or the like, and being formed with spaced annular indentations 12 and an enlarged end portion 13 to provide a secure grip thereon. Secured to handle portion 11 by a tapered screw member 14 is a scraper blade 15, preferably made of smooth plastic material. Blade 15 is generally rectangular, but is formed with smoothly rounded corners, and is outwardly convex.

Carried on the end of handle portion 11 adjacent the inner concave surface of blade 15 is a non-corrosive metal collar 16 of stainless steel or the like. Screw member 14 engages the end of said handle portion substantially axially of said collar 16, said collar serving to reinforce the engaged end of the handle portion against the wedging thrust exerted thereon by screw member 14.

In using the scraper, the operator grasps handle portion 11 and draws blade 15 rearwardly over the surface of the cut of meat, thus collecting surface accumulations of bone dust and other undesirable substances on the meat in the concave portion of blade 15. For a wide meat surface the longer edges of blade 15 are employed as the scraping elements. For narrower surfaces the shorter edges of the blade are employed.

Since the blade 15 and handle 11 are made of plastic which generally has a smoothly polished surface contour, it is easy to remove all adherent scraps of meat, bone dust, dirt, and the like, from the surfaces of the scraper. Likewise, said surfaces are not subject to corrosion and may be easily maintained in a sanitary condition. The edges of blade 15 are well defined and sufficiently rigid to efficiently accomplish the scraping action, yet not sharp enough to cut into the meat. The scraper is also very light in weight and easy to handle.

While a specific embodiment of a meat-scraping device has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A meat scraper comprising a smooth plastic handle member and an outwardly convex smooth plastic blade member, the end of the handle member carrying a non-corrosive metal collar in encircling relationship thereto, a tapered screw member passing through said blade member substantially centrally thereof into screw engagement with said end, said screw member being substantially coaxial with said collar, and the blade member being oriented so that said end is received within the concave portion of the blade member.

2. A meat scraper comprising a smooth plastic handle member and an outwardly convex smooth plastic blade member, the end of the handle member carrying a non-corrosive metal collar in encircling relationship thereto, a tapered screw member passing through said blade member substantially centrally thereof into screw engagement with said end, said screw member being substantially coaxial with said collar, and the blade member being oriented so that said end is received within the concave portion of the blade member, said blade member being substantially rectangular in outline, one pair of parallel edges thereof being substantially longer than the other pair of parallel edges thereof.

NATE GAMBINO.
NATE LA ROSA.

REFERENCES CITED

The following references are of record in the file of this patent:

UNITED STATES PATENTS

| Number | Name | Date |
| --- | --- | --- |
| 659,084 | Mason | Oct. 2, 1900 |
| 746,428 | Winne | Dec. 8, 1903 |
| 2,294,096 | Rice | Aug. 25, 1942 |

FOREIGN PATENTS

| Number | Country | Date |
| --- | --- | --- |
| 17,544 | Great Britain | 1898 |